United States Patent
Shaver et al.

(10) Patent No.: US 6,920,571 B2
(45) Date of Patent: Jul. 19, 2005

(54) STEERING CIRCUIT AND METHOD THAT GRADUALLY COUNTS A VOLTAGE OUTPUT CODE UNTIL MATCHING A VOLTAGE INPUT CODE

(75) Inventors: Charles N. Shaver, Cypress, TX (US); Joseph A. Clegg, Spring, TX (US); James A. Windsor, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 528 days.

(21) Appl. No.: 09/736,614

(22) Filed: Dec. 14, 2000

(65) Prior Publication Data

US 2002/0109489 A1 Aug. 15, 2002

(51) Int. Cl.⁷ .............................. G06F 1/26; G06F 1/32; G05F 1/40

(52) U.S. Cl. ...................... 713/310; 713/323; 323/283

(58) Field of Search ................................ 713/310, 300, 713/323; 323/283, 285; 307/149

(56) References Cited

U.S. PATENT DOCUMENTS

| | | | | |
|---|---|---|---|---|
| 5,528,127 | A | * 6/1996 | Streit | 323/269 |
| 5,632,039 | A | 5/1997 | Walker et al. | |
| 5,764,529 | A | * 6/1998 | Capps et al. | 716/1 |
| 5,925,133 | A | * 7/1999 | Buxton et al. | 713/323 |
| 6,035,358 | A | * 3/2000 | Tanikawa | 710/310 |
| 6,100,673 | A | * 8/2000 | Bair et al. | 323/255 |
| 6,106,565 | A | * 8/2000 | Stapleton et al. | 703/23 |
| 6,223,297 | B1 | * 4/2001 | Inoue | 713/501 |
| 6,457,135 | B1 | * 9/2002 | Cooper | 713/323 |
| 6,459,175 | B1 | * 10/2002 | Potega | 307/149 |
| 6,538,419 | B1 | * 3/2003 | Allen et al. | 323/285 |

FOREIGN PATENT DOCUMENTS

EP          1054502 A1 * 5/2000

OTHER PUBLICATIONS

Nam H. Pham, "On–Chip Capacitor Measurement for High Performance Microprocessor", IEEE 1998, pp. 65–68.*
Herrell et al., "EMI and Power Delivery Design in PC systems", IEEE 1997, pp. 23–26.*
*Microprocessor CORE Voltage Regulator Multi–Phase Buck PWM Controller*, Intersil Data Sheet HIP6301, Mar. 2000, © Intersil Corporation 2000, pp. 1–16.
*AMD Athlon™ Processor Voltage Regulation Design Application Note*, Publication # 22651, Rev: E–1, Feb. 2000, © 2000 Advanced Micro Devices, Inc., pp. i–vi and 1–14.
*AMD Athlon™ Processor Module Data Sheet*, Publication # 21016, Rev: M, Jun. 2000, © 2000 Advanced Micro Devices, Inc., pp. i–ii, 13–20, 25, and 28.
*AMD Duron™ Processor Module 3 Data Sheet*, Publication # 23802, Rev: F, Oct. 2000, © 2000 Advanced Micro Devices, Inc., pp. i–ii, 9–16, 22–24, and 33–38.

(Continued)

*Primary Examiner*—Chun Cao

(57) ABSTRACT

A voltage regulation steering circuit reads a voltage input code from a device and detects a set of predetermined conditions for gradually counting an output voltage code. Depending upon the set of predetermined conditions, the steering circuit either gradually counts the output voltage code from a predetermined initial voltage code to the voltage input code or gradually counts the output voltage code from the voltage input code to a predetermined low voltage code. As the steering circuit gradually counts from the predetermined initial voltage code, the steering circuit compares the output voltage code to voltage input code until the output voltage code matches the voltage input code. As the steering circuit gradually counts from the voltage input code, the steering circuit compares the output voltage code to the predetermined low voltage code until the voltage output code matches the predetermined low voltage code. The output voltage code is provided from the steering circuit to a voltage controller.

35 Claims, 2 Drawing Sheets

OTHER PUBLICATIONS

*AMD Athlon™ Processor Module Signal and Power–Up Requirements Application Note*, Publication # 23811, Rev: B, Jun. 2000, © 2000 Advanced Micro Devices, Inc., pp. i–iv and 1–12.

*Analog Devices, ADP 3160, 5–Bit Programmable 2–Phase Synchronous Buck Controller*, © Analog Devices, Inc., 2000, pp. 1–12.

*Mobile Pentium® III Processors Featuring Intel® Speed-Step™ Technology–Desktop–Class Performance and Low Power for Longer Battery Life*, Intel® SpeedStep® Technology Backgrounder, © 2000 Intel Corporation, pp. 1–4.

*Intel® Mobile Pentium® III Processors Featuring Intel® SpeedStep™ Technology*, Apr. 2000, © 2000 Intel Corporation, 5 pages.

*MITSUMI System Reset Monolithic IC PST591–595 Data Sheet*, 6 pages.

*No Compromise Portability, Performance and Power Management*, Mobile Intel® Pentium® III Processors Featuring Intel® SpeedStep™ Technology, Sep. 2000, © 2000 Intel Corporation, 2 pages.

\* cited by examiner

STEERING CIRCUIT AND METHOD THAT GRADUALLY COUNTS A VOLTAGE OUTPUT CODE UNTIL MATCHING A VOLTAGE INPUT CODE

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention generally relates to voltage regulation for microprocessors and more particularly to a voltage regulation steering circuit for a microprocessor.

2. Description of the Related Art

The importance of voltage regulation for microprocessors has grown as processor voltages continue to drop and processor power continues to increase. In personal computers, voltage regulation is especially needed during voltage transition periods for a microprocessor. With certain personal computer systems, processor core voltage changes have occurred during a power-up sequence for a microprocessor, a transition of a computer system into a low power mode, and a transition of a computer system from a low power mode.

A primary component of voltage regulation circuitry in a computer system has been a voltage controller, also termed a switching regulator controller. A voltage controller typically receives a programmable voltage identification (VID) code from a microprocessor to be decoded by an internal digital-to-analog converter (DAC) of the voltage controller. Based on the particular VID code, the voltage controller provides pulse width modulated (PWM) voltage outputs to a set of logic drivers for driving a set of power transistors to supply a certain core voltage to the microprocessor.

To protect the microprocessor, power supply and overall power system of a personal computer system, a voltage controller has employed over-voltage, under-voltage and over-current protection. Such protection typically involves the voltage controller monitoring a feedback signal indicating the processor core voltage and comparing the processor core voltage to the VID code. If the processor core voltage is greater than an over-voltage threshold defined by a predetermined percentage above the VID code, then an over-voltage condition is detected. Detection of an over-voltage condition may result in a shutdown of the voltage controller or a substantial reduction of the output voltage. After a substantial reduction of the output voltage, the microprocessor may not recover, such that the computer system becomes trapped in a low power mode. If the processor core voltage is less than an under-voltage threshold defined by a predetermined percentage below the VID code, then an under-voltage condition is detected. Detection of an under-voltage condition may trigger a power-good (PWRGD) signal from the power supply to be deasserted to indicate the processor core voltage is outside of a proper operating range, causing the system to reset.

There are critical reliability issues with voltage regulation circuitry during voltage transitions for a microprocessor. For a power-up initialization sequence of a microprocessor, a soft-start function is typically used by voltage regulation circuitry to move a processor core voltage up to an established intermediate voltage from which there is essentially an instantaneous voltage transition from the intermediate voltage to a desired processor core voltage. In the case of the AMD Athlon™ processor available from Advanced Micro Devices, an acceptable intermediate or low power voltage is 1.300 volts and the desired processor core voltage is 1.750 volts. In the case of the AMD Duron™ processor also available from Advanced Micro Devices, an acceptable intermediate or low power voltage is 1.300 volts and the desired processor core voltage is 1.600 volts. A sudden change in a processor core voltage introduces large inrush currents that produce undue stress on power supply output capacitors, input capacitors of voltage regulation circuitry, output capacitors of voltage regulation circuitry, and power transistors of voltage regulation circuitry. Such undue stress may significantly reduce the life of voltage regulation circuitry. Abrupt changes in a processor core voltage may also result in "false" over-voltage, under-voltage and over-current conditions detected by the voltage controller which may shut off the voltage regulation circuitry. Since inrush currents also affect the power supply, another risk of instantaneous processor core voltage changes is that the power supply may be shut down due to excessive output current slew rates or additional voltage perturbations.

SUMMARY OF THE INVENTION

Briefly, a voltage regulation steering circuit reads a voltage input code from a device and detects a set of predetermined conditions for gradually counting an output voltage code. Depending upon the set of predetermined conditions, the steering circuit either gradually counts the output voltage code from a predetermined initial voltage code to the voltage input code or gradually counts the output voltage code from the voltage input code to a predetermined low voltage code. As the steering circuit gradually counts from the predetermined initial voltage code, the steering circuit compares the output voltage code to the voltage input code until the output voltage code matches the voltage input code. As the steering circuit gradually counts from the voltage input code, the steering circuit compares the output voltage code to the predetermined low voltage code until the output voltage code matches the predetermined low voltage code. The output voltage code is provided from the steering circuit to a voltage controller.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

Figure 1:
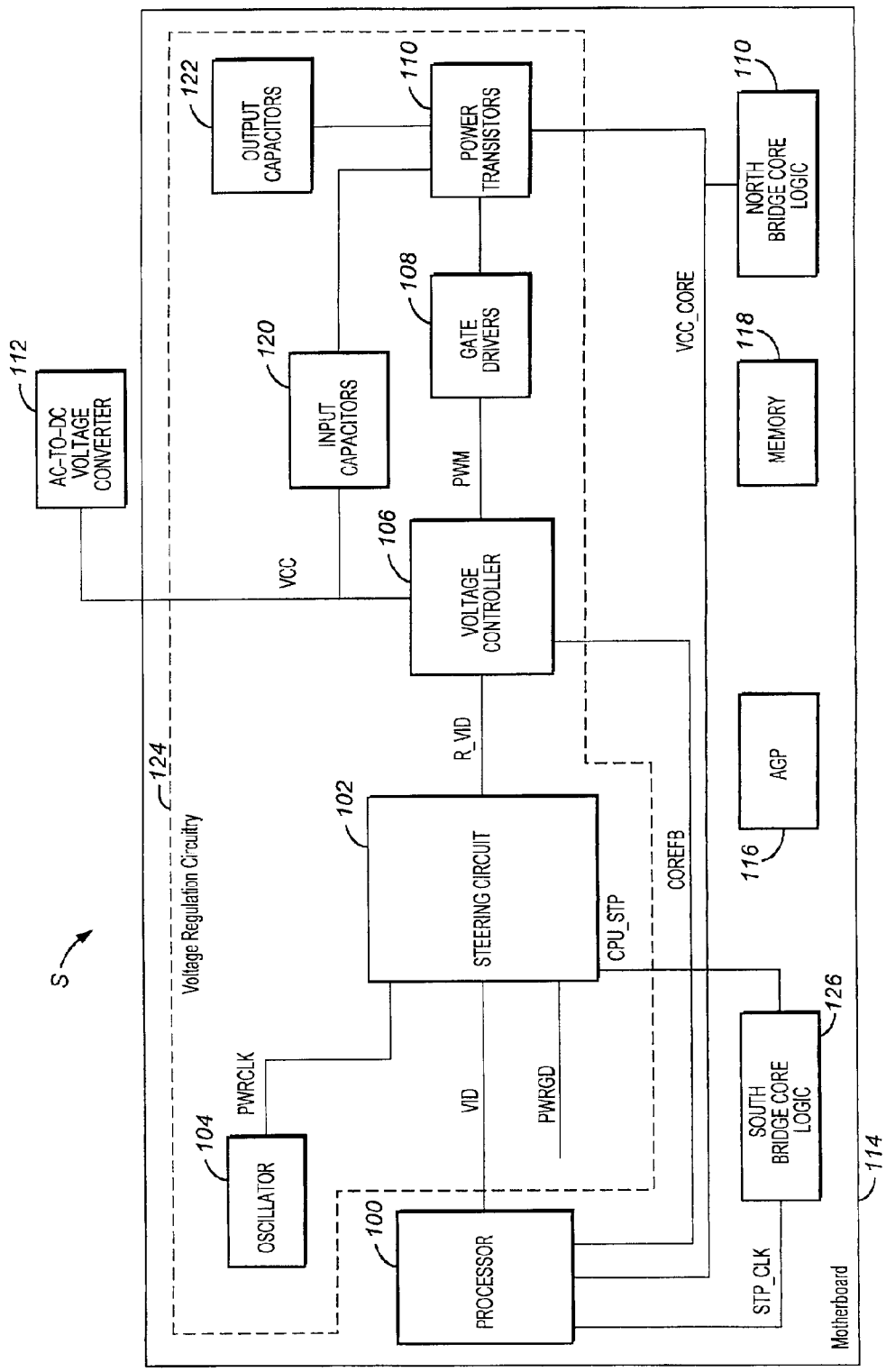
FIG. 1 is a block diagram illustrating a computer system motherboard containing a voltage regulation steering circuit.

Turning now to the drawings, FIG. 1 provides a block diagram of a motherboard M for a computer system S, which may be a low-end, mainstream or high-end desktop computer, for example. The motherboard M generally includes a processor 100, voltage regulation circuitry 124, a memory 118, an advanced graphics port (AGP) 116, north bridge core logic 110 and south bridge core logic 126. The processor 100 may, for example, be an AMD Athlon™ processor or an AMD Duron™ processor available from Advanced Micro Devices. Alternatively, the processor 100 may be any microprocessor that supports processor core voltage changes. The voltage regulation circuitry 124 generally includes a steering circuit 102, a voltage controller 106, gate drivers 108, power transistors 110, input capacitors 120, output capacitors 122 and an oscillator 104.

The processor 100 provides a voltage input code VID representing an operating voltage of the processor 100 to the steering circuit 102. The steering circuit 102 receives both a PWRGD signal and a CPU_STP signal as inputs. The PWRGD signal, which may be provided by the voltage controller 106 or another portion of the voltage regulation circuitry 124, generally indicates when a predetermined period of time has passed after power (VCC) in the computer system S is stable. More particularly, instead of the voltage controller 106, a counter circuit such as the PST591 from Mitsumi may be used to generate the PWRGD signal. Those skilled in the art will appreciate that the PWRGD signal may be derived in a variety of ways. For example, the PWRGD signal may even be a function of whether power to the steering circuit 102 itself is stable. When the PWRGD signal goes low, the computer system S has either just powered up or the computer system S is about to lose power. It should be understood that the PWRGD signal is different from a system PWRGD signal from a power supply that typically does not assert until a minimum of 100 milliseconds after VCC is stable. In contrast, the PWRGD signal described herein may issue 10–50 milliseconds after VCC is stable, for example. The PWRGD signal does not assert high to the steering circuit 102 until VCC is at a proper level.

The CPU_STP signal, which is provided by the south bridge core logic 126, generally indicates whether the computer system S is transitioning into a low power mode or from a low power mode. The south bridge core logic 126 also provides a STP_CLK signal to the processor 100. When the computer system S is entering a low power mode, the south bridge core logic 126 asserts STP_CLK first and then asserts CPU_STP. The processor 100 uses STP_CLK to disconnect from a host bus before entering a low power mode. Asserting STP_CLK first ensures that the processor 100 is disconnected from the host bus before the processor core voltage VCC_CORE is changed. When the computer system S is resuming from the low power mode, the south bridge core logic 126 deasserts CPU_STP first and then deasserts STP_CLK. When the computer system S is resuming from a low power mode, by deasserting CPU_STP first, the processor core voltage VCC_CORE is raised to full voltage before the processor 100 is reconnected to the host bus.

When the CPU_STP signal goes low, the computer system S is transitioning into a low power mode. When the CPU_STP signal goes high, the computer system S is transitioning from a low power mode. The steering circuit 102 generally utilizes transitions for the PWRGD signal and the CPU_STP signal to determine when to read or pass through the voltage input code VID from the processor 100 and when and in which direction to "steer" an output voltage code R_VID for the voltage controller 106. While the voltage controller 106 and the steering circuit 102 are shown as distinct components, in an alternative embodiment, the voltage controller 106 and the steering circuit 102 may be integrated. For example, a microcontroller may be implemented to support the functionality of the voltage controller 106 and the steering circuit 102.

The steering circuit 102 is programmed to gradually count the output voltage code R_VID for the voltage controller 106. If the CPU_STP signal indicates the computer system S is powering up or resuming from a low power mode, then the steering circuit 102 gradually counts the output voltage code R_VID from a predetermined initial voltage code to the voltage input code VID. As the steering circuit 102 gradually counts from the predetermined initial voltage code, the steering circuit 102 compares the output voltage code R_VID to the voltage input code VID until the output voltage code R_VID matches the voltage input code VID. If the CPU_STP signal indicates the computer system S is entering a low power mode, then the steering circuit 102 gradually counts the output voltage code R_VID from the voltage input code VID to a predetermined low voltage code. As the steering circuit 102 gradually counts from the voltage input code VID, the steering circuit 102 compares the output voltage code R_VID to the predetermined low voltage code until the output voltage code R_VID matches the predetermined low voltage code. The predetermined initial voltage code and the predetermined low voltage code may correspond to an acceptable intermediate voltage for the particular processor 100.

The steering circuit 102 gradually counts up or down to gracefully transition the output voltage code R_VID for the voltage controller 106. This transition is "graceful" in the sense that a processor core voltage change may be accomplished for the processor 100 without "false" over-voltage, under-voltage or over-current conditions by the voltage controller 106 or a shutdown of the motherboard M. One contributing factor to the graceful transition is that the oscillator 104 slowly clocks the steering circuit 102 at a sufficient speed to avoid the "false" conditions mentioned above. In other words, the oscillator 104 insures that the voltage output codes R_VID do not change fast enough for the voltage output code R_VID to be too much above or below the processor core voltage VCC_CORE. If the voltage output code R_VID changes too fast when the voltage is rising, then an over-voltage condition occurs. If the voltage output code R_VID changes too fast when the voltage is falling, then an under-voltage condition occurs. With this in mind, the oscillator 104 should include a comparator with a suitable time period. For example, the oscillator 104 may be implemented with the LM393 dual differential comparator available from component manufacturers such as Fairchild Semiconductor, National Semiconductor, and Texas Instruments. In a disclosed embodiment, the oscillator 104 causes the steering circuit 102 to count or cycle every 30 microseconds. Those skilled in the art will appreciate that an oscillator may be implemented in a variety of ways. Operation and use of the steering circuit 102 is further described below.

Moving to the voltage controller 106, based on the output voltage code R_VID from the steering circuit 102, the voltage controller 106 provides pulse width modulated (PWM) outputs to the gate drivers 108 that in turn drive the power transistors 110. The gate drivers 108 are typically of a multi-phase configuration, and the power transistors 110 are typically power MOSFETs. The power transistors 110 are coupled to the input capacitors 120 and the output capacitors 122, which conduct power supplied to the processor 100. As shown, the input capacitors 120 are also coupled to the supply voltage VCC from the AC-to-DC voltage converter 112. The processor core voltage (or core power) VCC_CORE is provided by the power transistors 110 to the processor 100 and the north bridge core logic 110. With VCC_CORE known to the north bridge core logic 110, the north bridge core logic 110 uses the proper reference level to interface to the processor 100. As also shown, an analog feedback core voltage signal COREFB indicating the processor core voltage VCC_CORE is provided from the processor 100 to the voltage controller 106. Another input to the voltage controller 106 is a source voltage VCC (such as 5 or 12 volts, for example) from a power supply 112 (AC-to-DC voltage converter) located off the motherboard M. The power supply 112 is configured so that VCC does not drop below a certain voltage level to ensure the steering circuit 102 does not see a "false" removal of PWRGD. Examples of a suitable voltage controller include but are not limited to the HIP6301 available from Intersil Corporation and the ADP3160 available from Analog Devices. Further, the voltage controller 106 may be designed to monitor the processor core voltage VCC_CORE and/or its VCC voltage. Certain typical components of a motherboard and voltage regulation circuitry are omitted for sake of clarity.

For explanatory purposes only, let it be assumed that the steering circuit 102 is implemented as a programmable logic device containing state machine code in a hardware description language suitable for a programmable logic device, such as ABEL for example. The code generally defines inputs, outputs, state registers, and equations for the steering circuit 102. In this example, the voltage output code R_VID is a 5-bit code that may range from 1.300 volts to 1.850 volts. A table representing a state register assignment for the output voltage code R_VID over such a voltage range is provided below:

| | |
|---|---|
| 1.300 volts | [1, 0, 1, 1, 0] |
| 1.325 volts | [1, 0, 1, 0, 1] |
| 1.350 volts | [1, 0, 1, 0, 0] |
| 1.375 volts | [1, 0, 0, 1, 1] |
| 1.400 volts | [1, 0, 0, 1, 0] |
| 1.425 volts | [1, 0, 0, 0, 1] |
| 1.450 volts | [1, 0, 0, 0, 0] |
| 1.475 volts | [0, 1, 1, 1, 1] |
| 1.500 volts | [0, 1, 1, 1, 0] |
| 1.525 volts | [0, 1, 1, 0, 1] |
| 1.550 volts | [0, 1, 1, 0, 0] |
| 1.575 volts | [0, 1, 0, 1, 1] |
| 1.600 volts | [0, 1, 0, 1, 0] |
| 1.625 volts | [0, 1, 0, 0, 1] |
| 1.650 volts | [0, 1, 0, 0, 0] |
| 1.675 volts | [0, 0, 1, 1, 1] |
| 1.700 volts | [0, 0, 1, 1, 0] |
| 1.725 volts | [0, 0, 1, 0, 1] |
| 1.750 volts | [0, 0, 1, 0, 0] |
| 1.775 volts | [0, 0, 0, 1, 1] |
| 1.800 volts | [0, 0, 0, 1, 0] |
| 1.825 volts | [0, 0, 0, 0, 1] |
| 1.850 volts | [0, 0, 0, 0, 0] |

As can be seen, there is a 25 millivolt step between each adjacent output voltage code R_VID in the table. For this example, it is noted that in as the count increases the voltage decreases and as the count decreases the voltage increases. In this case, 25 millivolts represents the maximum resolution for a 5-bit digital-to-analog converter (DAC) of the voltage controller 106. By selecting a voltage step for the output voltage code R_VID corresponding to the maximum resolution of the internal DAC of the voltage controller 106, in-rush currents for the voltage regulation circuitry 124 are minimized. It should be understood that the particular voltage step employed between each adjacent output voltage code R_VID may vary. Further, the illustrated voltage range is exemplary only as the steering circuit 102 may be designed to accommodate any range of voltage output codes and any processor core voltage.

For this example, it is also assumed that the processor 100 is the AMD Athlon™, such that the acceptable intermediate voltage is 1.300 volts and the desired processor core voltage is 1.750 volts. If the computer system S is powering up or resuming from a low power mode, then the output voltage code R_VID gradually cycles through the output voltage codes shown above from 1.300 volts to 1.750 volts. If the computer system S is entering a low power mode, then the output voltage code R_VID gradually cycles through the output voltage codes shown above from 1.750 volts to 1.300 volts.

Figure 2:
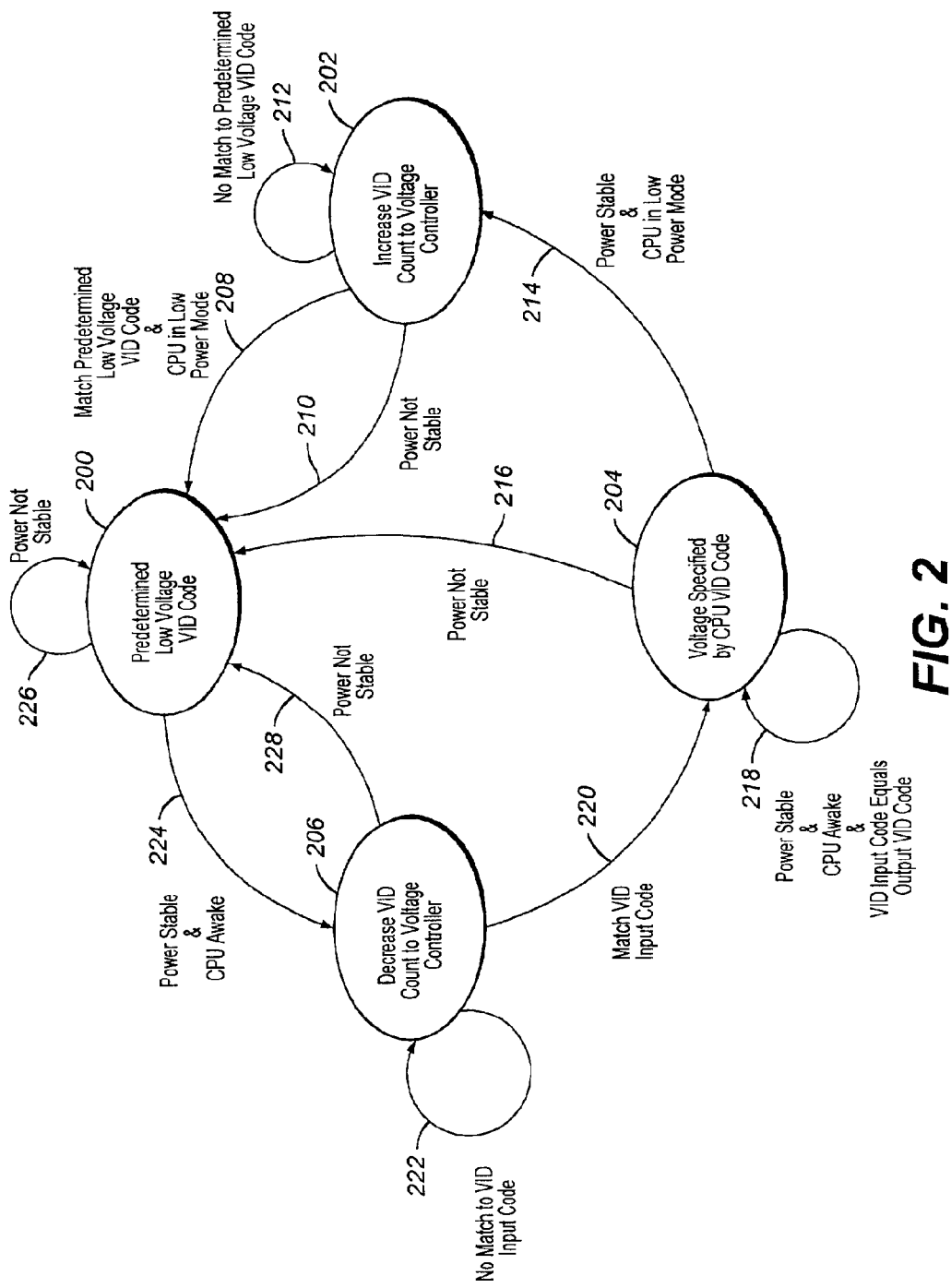
FIG. 2 is an exemplary state diagram for the voltage regulation steering circuit of FIG. 1.

Referring to FIG. 2, an exemplary state diagram for the steering circuit 102 is shown. The steering circuit 102 transitions through states 200, 202, 204 and 206. In state 200, the count (VID count) is set to the predetermined low voltage input code VID. In state 202, the count is increased to the voltage controller 106. In state 206, the count is decreased to the voltage controller 106. In state 204, the count is specified by the voltage input code VID (CPU VID code) from the processor 100. While the steering circuit 102 is in state 200, if it is determined that the processor 100 is awake or in a normal power mode and the power (VCC) in the computer system S is stable, then the steering circuit 102 transitions to state 206. It should be understood that reference to stable power in connection with FIG. 2 refers to a predetermined period of time after power is stable. In state 206, the output voltage code R_VID is decremented to the next output voltage code R_VID. Control remains in state 206 while there is no match between the output voltage code R_VID and the voltage input code VID (VID input code). The state transition 224 from state 200 to state 206 may be represented by the following equation:

When $(CPU\_STP\ \&\ PWRGD\ \&\ !STOP)$ then $R\_VID := R\_VID-1$.

Based on this equation, when a STOP variable goes high, a match between the output voltage code R_VID and the final digital count, which in this example is the voltage code for 1.750 volts, is detected. The STOP variable is here defined through a set of bitwise logical operations to minimize the number of gates implemented in the steering circuit 102. An exemplary set of equations for the STOP variable is provided below:

STOP=STOP_1 & STOP_2;

STOP_1=(R_VVD4!$ VID4)&(R_VID3!$ VID3)& (R_VID2!$ VID2);

STOP_2=(R_VID1!$ VID1)&(R_VID0!$ VID0).

The STOP variable is defined as the result of a logical AND operation between a STOP_1 variable and a STOP_2 variable. As can be seen, the STOP_1 variable is defined to compare the three most significant bits of the voltage output code (R_VID4, R_VID3, and R_VID2) to the three most significant bits of the voltage input code (VID4, VID3 and VID2) through logical XNOR operations. The STOP_2 variable is defined to compare the two least significant bits of the voltage output code (R_VID1 and R_VID0) to the two least significant bits of the voltage input code (VID1 and VID0) through logical XNOR operations. As an alternative to XNOR operations, the STOP_1 and STOP_2 variables may be defined through logical XOR or other logical operations. Those skilled in the art will appreciate that comparison operations may be performed in a variety of ways, such as a multi-stage comparison for example. The STOP variable is generally used to determine when the steering circuit 102 should stop counting.

If the voltage input code VID represents 1.750 volts such as in the case of the processor 100 being the AMD Athlon™ processor, then STOP_1 is zero until the count of the voltage output code R_VID hits 1.675 volts; STOP_1 is one between 1.675 volts and 1.750 volts; STOP_2 is one at 1.350 volts, 1.450 volts, 1.550 volts, 1.650 volts and 1.750 volts; and STOP_2 is zero at all other times. If the voltage input code VID represents 1.600 volts such as in the case of the processor 100 being the AMD Duron™ processor, then STOP_1 is zero until the count of the voltage output code R_VID gets to 1.575 volts; STOP_1 is one at 1.575 volts and 1.600 volts; STOP_2 is one at 1.300 volts, 1.400 volts, 1.500 volts and 1.600 volts; and STOP_2 is zero at all other counts. It should be understood that the above equations are illustrative only and may vary depending upon factors such as the bitsize of the voltage codes, the particular set of logic gates available, the selected logical operations, the core voltages required by the particular processor, the nature of the hardware description language compiler, and the available input and output pins of the steering circuit, for example.

From state 204, if it is determined that the processor 100 is asleep or in a low power mode and the power in the computer system S is stable, then the steering circuit 102 transitions to state 202 as shown by state transition 214. As shown by state transition 212, the steering circuit 102 remains in state 202 while there is no match between the voltage output code R_VID and the predetermined low voltage input code VID. In state 202, the digital count of the voltage output code R_VID is increased to the next voltage output code R_VID. The state transition 214 from state 204 to state 202 may be represented by the following exemplary equation:

When ($!CPU\_STP$ & $PWRGD$) then $R\_VID := R\_VID + 1$.

Based on this equation, the count of the voltage output code R_VID is increased if the CPU_STP signal is low and the PWRGD signal is high. In state 204, state transition 218 determines whether the processor 100 is awake or transitioning to a normal power mode, whether the power in the computer system S is stable and whether there is a match between the voltage output code R_VID and the final count indicated by the voltage input code VID. If these conditions are true, then the steering circuit 102 remains in state 204. State transition 218 may be represented by the following exemplary equation:

When ($STOP$ & $PWRGD$ & $CPU\_STP$) then $R\_VID := R\_VID$.

Based on this equation, if a match is found as indicated by the STOP variable being high, PWRGD is high indicating there is stable power, and CPU_STP is high indicating the processor 100 is awake, then the voltage output code R_VID is not changed. If it is determined that power is not stable while the steering circuit 102 is in any state, then the steering circuit transitions to state 200 as represented by state transitions 226, 228, 216 and 210. Determining if power is stable may be represented by the determination of whether the PWRGD signal is low. Control remains in step 200 as long as power is not stable. In state 200, the output voltage code R_VID is set to the predetermined low voltage code VID, the final count. Since the input voltage code VID is set to the predetermined lower voltage code during an initial voltage transition stage when the computer system S is powering up, it is appropriate to set the voltage output code R_VID to the predetermined low voltage code as well. The steering circuit 102 transitions from state 202 to state 200 if the output voltage code R_VID matches the predetermined low voltage code VID. From state 206 in which the processor 100 is awake, if the output voltage code R_VID is equal to the voltage input code VID, then the steering circuit transitions to state 204 as shown by state transition 220. State transitions 226, 228, 216, 210 and 208 in combination may be represented by the following exemplary equation:

When ($!PWRGD$ #($!CPU\_STP$ & ($R\_VID = V1300$))) then $R\_VID := V1300$.

In the above equation, "#" represents a logical OR operation and "V1300" represents the output voltage code R_VID for 1.300 volts, an acceptable intermediate voltage for voltage input code VID in this circumstance. In state transition 208, it may be determined whether the CPU_STP signal is low and whether the voltage output code R_VID is at the predetermined low voltage input code VID. The above equation basically determines if PWRGD is low, indicating the system is powering up or power is unstable, or if the computer system S is in a low power mode. In an alternative embodiment, the voltage level of the output voltage code R_VID when PWRGD is low may be different from the voltage level of the output voltage code R_VID when the computer system S is in a low power mode.

Based on the process as described above, and in the case of the AMD Athlon™ processor, the following behavior applies to the steering circuit 102. When PWRGD goes high, the steering circuit 102 begins counting up from 1.300 volts to 1.750 volts. After reaching 1.750 volts if CPU_STP goes low, then the steering circuit 102 begins counting down the voltage from 1.750 volts to 1.300 volts. At 1.300 volts if CPU_STP then goes high, then the steering circuit 102 begins counting up the voltage from 1.300 volts to 1.750 volts. If PWRGD goes low in the middle of counting, then the steering circuit 102 resets the count to 1.300 volts and stays at 1.300 volts until PWRGD goes high and CPU_STP is high also. Once PWRGD has gone low, both PWRGD and CPU_STP must be high for the steering circuit 102 to change the count back to 1.750 volts. Thus, for this example, the steering circuit 102 behaves as a 5-bit counter with conditions on when to start and stop counting.

One overall advantage of the disclosed techniques and embodiments is improvement in the reliability of voltage regulation circuitry, including but not limited to input capacitors, output capacitors, voltage controller and power transistors, during processor core voltage changes. A more specific advantage is that a voltage controller is not shutdown due to detection of "false" over-voltage, under-voltage and over-current conditions. Shutdown of the voltage controller is even avoided without impacting the analog section of the voltage controller or masking undesired effects of a voltage code change. A further advantage is that lock-ups of computer system motherboards during processor core voltage changes are largely avoided. An additional advantage is avoiding an excessive current slew rate or additional voltage perturbations for the power supply. Yet another specific advantage is that an overshoot or undershoot of the processor core voltage is less unlikely. These technical advantages are exemplary and not exhaustive. While a microprocessor is described herein as providing a voltage code, a steering circuit may also be used in connection with any device that provides a voltage code.

The disclosure and description of the various embodiments are illustrative and explanatory thereof, and various changes in the signals, variables, voltages, states, logic, counting scheme and components, as well as in the details of the illustrated circuitry and construction and method of operation may be made without departing from the spirit of the invention.

We claim:

1. A system, comprising:
   a device to provide a voltage input code;
   steering circuitry configured to:
   read the voltage input code from the device to be supplied a voltage output;
   detect a set of predetermined conditions associated with various modes of the system;
   gradually count a voltage output code from a predetermined initial voltage code to the voltage input code;
   compare the voltage output code to the voltage input code; and
   stop the count of the voltage output code when the voltage output code matches the voltage input code; and
   a voltage controller to receive the voltage output code from the steering circuitry and provide the voltage output to the device based on the voltage output code.

2. The system of claim 1, wherein the set of predetermined conditions comprises a signal indicating the device is powering up.

3. The system of claim 1, wherein the set of predetermined conditions comprises a signal indicating the device is resuming from a low power mode.

4. The system of claim 1, wherein the set of predetermined conditions comprises a signal indicating system power has been stable for a predetermined period of time.

5. The system of claim 1, the steering circuitry comprising:
   comparison circuitry to compare the voltage output code to the voltage input code; and
   detection circuitry to detect the set of predetermined conditions provided to the steering circuitry by a core bridge component.

6. The system of claim 1, further comprising:
   a clock to slowly clock the steering circuitry to maintain a predetermined amount of time between each voltage step of the output voltage code as the output voltage code is gradually counted.

7. The system of claim 1, wherein the device is a processor.

8. The system of claim 1, wherein the steering circuitry is implemented as a programmable logic device.

9. A system, comprising:
   a device to provide a voltage input code;
   steering circuitry configured to:
   read the voltage input code from the device;
   detect a set of predetermined conditions associated with various modes of the system;
   gradually count a voltage output code from the voltage input code to a predetermined low voltage code;
   compare the output voltage code to the predetermined low voltage code; and
   stop the count of the voltage output code when the voltage output code matches the predetermined low voltage code; and
   a voltage controller to receive the voltage output code and provide a voltage output to the device based on the voltage output code.

10. The system of claim 9, wherein the set of predetermined conditions comprises a signal indicating the device is being placed in a low power mode.

11. The system of claim 9, wherein the set of predetermined conditions comprises a signal indicating a system power has been stable for a predetermined period of time.

12. The system of claim 9, the steering circuitry comprising:
    comparison circuitry to compare the output voltage code to the predetermined low voltage code; and
    detection circuitry to detect the set of predetermined conditions provided to the steering circuitry by a core bridge component.

13. The system of claim 9, further comprising:
    a clock to slowly clock the steering circuitry to maintain a predetermined amount of time between each voltage step of the output voltage code as the output voltage code is gradually counted.

14. The system of claim 9, wherein the device is a processor.

15. The system of claim 9, wherein the steering circuitry is implemented as a programmable logic device.

16. A method, comprising the steps of:
    reading a voltage input code from a device;
    detecting a set of predetermined conditions associated with various modes of operating the device;
    gradually counting the voltage output code from a predetermined initial voltage code to the voltage input code responsive to the detecting step;
    comparing the voltage output code to the voltage input code;
    stopping the count of the voltage output code when the voltage output code matches the voltage input code; and
    providing power to the device based on the voltage output code.

17. The method of claim 16, the detecting step comprising the step of:
    detecting a signal indicating the device is powering up.

18. The method of claim 16, the detecting step comprising the step of:
    detecting a signal indicating the device is resuming from a low power mode.

19. The method of claim 16, the detecting step comprising the step of:
    detecting a signal indicating system power has been stable for a predetermined period of time.

20. The method of claim 16, further comprising the step of:
    detecting another set of predetermined conditions associated with various modes of operating the device;
    gradually counting a voltage output code from the voltage input code to a predetermined low voltage code responsive to the detecting step;
    comparing the voltage output code to a predetermined low voltage code; and
    stopping the count of the voltage output code when the voltage output code matches the predetermined low voltage code.

21. A method, comprising the steps of:
    reading a voltage input code from a device;
    detecting a set of predetermined conditions associated with various modes of operating the device; and
    gradually counting a voltage output code from the voltage input code to a predetermined low voltage code responsive to the detecting step;
    stopping the count of the voltage output code when the voltage output code matches the predetermined low voltage code; and providing power to the device based on the voltage output code.

22. The method of claim 21, the detecting step comprising the step of:
   detecting a signal indicating a transition of the device to a low power mode.

23. The method of claim 21, the detecting step comprising the step of:
   detecting a signal indicating system power has been stable for a predetermined period of time.

24. The method of claim 21, wherein the comparing the voltage output code to the predetermined low voltage code prevents false voltage or current conditions.

25. A voltage regulation steering circuit, comprising:
   detection circuitry to detect a set of predetermined conditions and to read a voltage input code from a device;
   a counter to gradually count a voltage output code from a predetermined initial voltage code to the voltage input code from the device responsive to detection of the set of predetermined conditions;
   comparison circuitry to compare the voltage output code to the voltage input code and to stop the count of the voltage output code when the voltage output code matches the voltage input code; and
   circuitry that supplies power to the device based on the voltage output code.

26. The circuit of claim 25, wherein the set of predetermined conditions comprises a signal indicating the device is powering up.

27. The circuit of claim 25, wherein the set of predetermined conditions comprises a signal indicating the device is resuming from a low power mode.

28. The circuit of claim 25, wherein the set of predetermined conditions comprises a signal indicating system power has been stable for a predetermined period of time.

29. The circuit of claim 25, wherein the comparison circuitry reduces false voltage or current conditions by comparing the voltage output code to the voltage input code.

30. A voltage regulation steering circuit, comprising:
   detection circuitry to detect a set of predetermined conditions and to read a voltage input code from a device;
   a counter to gradually count a voltage output code from the voltage input code from the device to a predetermined low voltage code responsive to detection of the set of predetermined conditions;
   comparison circuitry configured to compare the voltage output code to the predetermined low voltage code and to stop the count of the voltage output code when the voltage output code matches the predetermined low voltage code; and
   circuitry that supplies power to the device based on the voltage output code.

31. The steering circuit of claim 30, wherein the set of predetermined conditions comprises a signal indicating the device is being placed into a low power mode.

32. The steering circuit of claim 30, wherein the set of predetermined conditions comprises a signal Indicating system power has been stable for a predetermined period of time.

33. The steering circuit of claim 30, wherein the comparison circuitry reduces false voltage or current conditions by comparing the voltage output code to the predetermined low voltage code.

34. A computer system motherboards comprising:
   a processor to provide a voltage input code that is utilized to reduce false voltage and current conditions;
   voltage regulation circuitry, comprising:
      steering circuitry configured to:
         read the voltage input code from the processor;
         detect a set of predetermined conditions associated with various modes of operation for the processor;
         gradually count a voltage output code from a predetermined initial voltage code to the voltage input code; and
         stop the count of the voltage output code when the voltage output code matches the voltage input code; and
      a voltage controller to receive the voltage output code and provide a voltage signal based on the voltage output code to the processor; and
   core bridge logic coupled to the voltage regulation circuitry and configured to provide the set of predetermined conditions that indicate various modes of operation for the processor.

35. A computer system motherboard comprising:
   a processor to provide a voltage input code;
   voltage regulation circuitry comprising:
      steering circuitry configured to:
         read the voltage input code from the processor;
         detect a set of predetermined conditions associated with various modes of operation for the processor;
         gradually count a voltage output code from the voltage input code to a predetermined low voltage code; and
         stop the count of the voltage output code when the voltage output code matches the predetermined low voltage code; and
      a voltage controller to receive the voltage output code and provide a voltage signal based on the voltage output code to the processor; and
   core bridge logic coupled to the voltage regulation circuitry and configured to provide the set of predetermined conditions that indicate the various modes of operation for the processor.

* * * * *

UNITED STATES PATENT AND TRADEMARK OFFICE
CERTIFICATE OF CORRECTION

PATENT NO. : 6,920,571 B2 Page 1 of 1
APPLICATION NO. : 09/736614
DATED : July 19, 2005
INVENTOR(S) : Charles N Shaver et al.

It is certified that error appears in the above-identified patent and that said Letters Patent is hereby corrected as shown below:

Claim 32, Column 12, line 5, delete "Indicating" and insert therefor --indicating--

Claim 34, Column 12, line 12, delete "motherboards" and insert therefor --motherboard--

Signed and Sealed this

Sixth Day of January, 2009

JON W. DUDAS
*Director of the United States Patent and Trademark Office*